(12) United States Patent
Daoud

(10) Patent No.: US 6,360,051 B1
(45) Date of Patent: Mar. 19, 2002

(54) SPLICE HOLDER WITH IMPROVED ACCESS FEATURE

(75) Inventor: Bassel Hage Daoud, Parsippany, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/364,812

(22) Filed: Jul. 30, 1999

(51) Int. Cl.$^7$ .................................................. G02B 6/36
(52) U.S. Cl. ........................ 385/137; 385/134; 385/135; 385/136
(58) Field of Search ................................. 385/134–137, 385/147

(56) References Cited

U.S. PATENT DOCUMENTS 4,865,412 A * 9/1989 Patterson ..................... 385/71
5,515,472 A * 5/1996 Mullaney et al. ........... 385/135

* cited by examiner

*Primary Examiner*—Rodney Bovernick
*Assistant Examiner*—Sarah U. Song
(74) *Attorney, Agent, or Firm*—Howard C. Miskin; Gloria Tsui-Yip

(57) ABSTRACT

A splice holder for securing and retaining fiber optic splices. The splice holder improves access to individual splices and minimizes interference to adjacent splices during removal. The splice holder comprises a hollow base having a first flat portion and a second enclosing portion defining a hollow longitudinal space therebetween. A plurality of parallel, spaced apart longitudinal members extend from the second portion away from the hollow space. Adjacent pairs of members define a channel for retaining a splice. Within the hollow space is a transversely extending wall for structural support of the second portion, which divides the space into two cavities. The cavities provide improved access to the underside of a splice.

10 Claims, 3 Drawing Sheets

SPLICE HOLDER WITH IMPROVED ACCESS FEATURE

FIELD OF THE INVENTION

The invention relates to a device for securing and retaining fiber optic splices which facilitates access to individual splices and minimizes interference with adjacent splices during removal.

BACKGROUND OF THE INVENTION

Telecommunications utilizing fiber optic technology improves the quality of communications and can handle a higher volume of voice and data transfer than similar sized copper electrical wiring and cables. To provide interconnections between widely separated points, splicing is required to join cables and wires. For example, splices are used commonly, in part, to interconnect subscribers to a telecommunication provider, such as a telephone service provider.

Two common types of fiber optic splices are the single fusion splice and the mass fusion splice, both generally known in the art of fiber optic technology. Single fusion splices have a smaller cross-sectional area and longer in length than mass fusion splices. Due to the need to maintain the quality of transmission over the spliced connection, splices are secured in some manner, such as in a splice holder, to prevent undesired agitation and/or damage. A splice holder also organizes and arranges the splices to facilitate identification and servicing by a technician whenever required. Splice holders are typically made of a foam material and placed on a fiber optic tray forming part of a distribution panel, usually located in a basement of a subscriber.

A prior art single fusion splice holder may be further described with reference to FIGS. 1 and 2. FIG. 1 shows a splice holder 10 comprising nine parallel, spaced apart members $11_1 \ldots 11_9$ extending upwardly from an integral base 12. Each adjacent pair of members, such as $11_1$–$11_2$, defines a channel 13 therebetween having a constricted neck 14 for retaining and securing a splice. Each channel 12 has a cross-sectional area corresponding to that of a corresponding splice for frictional hold. Each constricted neck 14 has a width slightly narrower than the width of a corresponding splice for additional frictional hold and prevents inadvertent dislodgment. As shown in FIG. 2, typical dimensions of splice holder 10 measures 1.43 inches in width, with adjacent channels being 0.17 inch apart.

Splice holder 10 typically further comprises a plastic housing (not shown) for mounting the base 12 to provide further structural support to splice holder 10. Splice holder 10 is flat, with each channel 13 being on a plane parallel to base 12 and near the bottom mounting surface 15 of splice holder. The position of channels 13 near the bottom mounting surface 15 limit access to the underside 16 of a splice 17 for removal. Furthermore, removal of one splice may interfere with the closely positioned adjacent splice.

Therefore, there is a need for an improved splice holder for securing splices that facilitates access to individual splices and minimizes interference to neighboring splices during removal.

SUMMARY OF THE INVENTION

The invention provides a holder for securing and retaining fiber optic splices. The improved splice holder of the present invention improves access to individual splices and minimizes interference to adjacent splices during removal.

The splice holder of the present invention comprises a hollow base having a first flat portion and a second enclosing portion, defining a hollow space therebetween. Extending from the outer surface of the second portion of the base and away from the hollow space are a plurality of parallel, spaced apart, longitudinally extending resilient members. Each adjacent pair of members define a channel therebetween for situating and retaining a splice. Within the hollow base is a transversely extending wall dividing the space therein into two cavities. The flat portion of the base is for mounting the splice holder, directly or indirectly, onto a splice tray.

The dividing wall within the hollow space provides additional structural support to the channels and second portion of the base. The positioning of splices along the second portion of the base improves access to the underside of splices by providing more room between the splice and the flat mounting portion of the base than a prior art splice holder. Additionally, the two cavities within the hollow base provide further access to the underside of both ends of a splice secured in a channel.

Advantageously, the splice holder of the present invention improves access to splices mounted thereon to be serviced and increases the density of splices while maintaining the same mounting surface area as the prior art splice holder discussed in the Background section.

It will be appreciated that, for purposes of illustration, these figures are not necessarily drawn to scale.

DETAILED DESCRIPTION OF THE PREFERRED EMBODIMENTS

Figure 1:
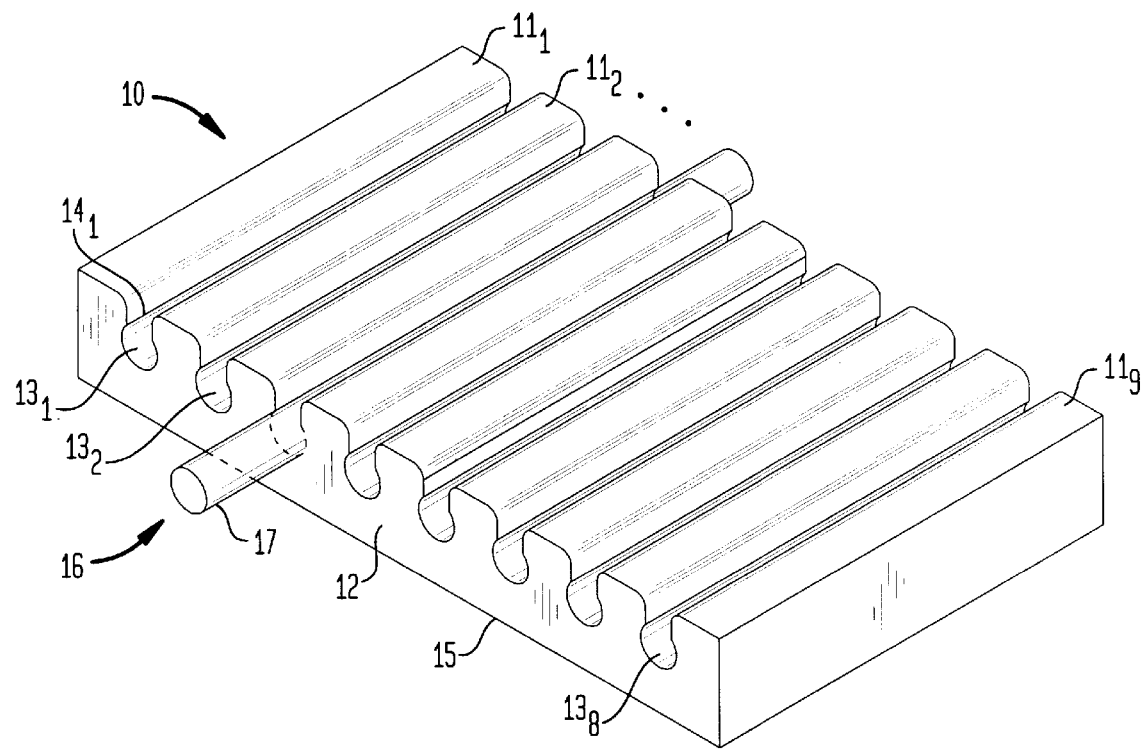
FIG. 1 is a perspective view of a prior art splice holder.
Figure 2:
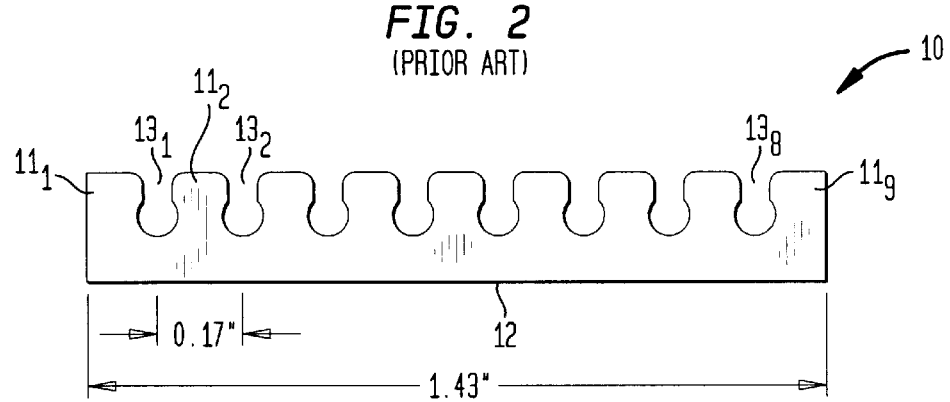
FIG. 2 is the front elevational view of the prior art splice holder of FIG. 1.
Figure 3:
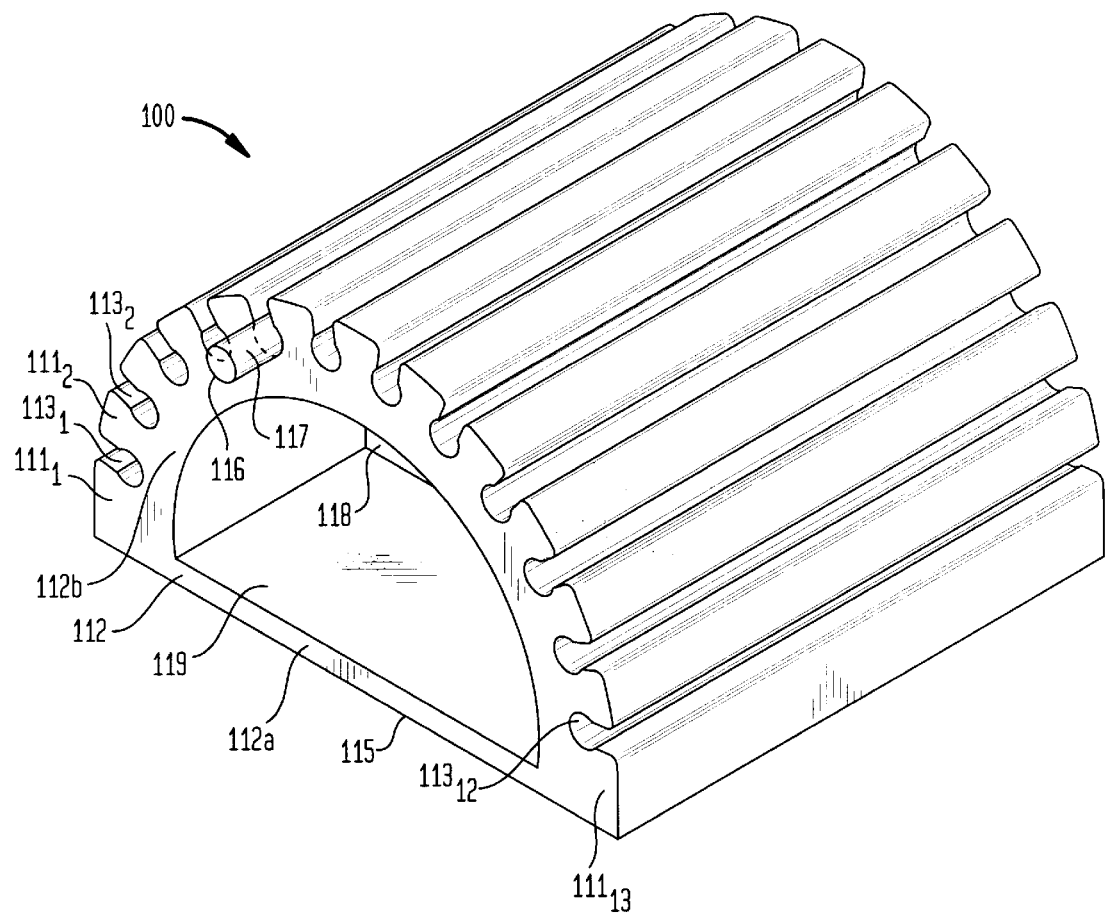
FIG. 3 is a perspective view of the splice holder of the present invention.
Figure 4:
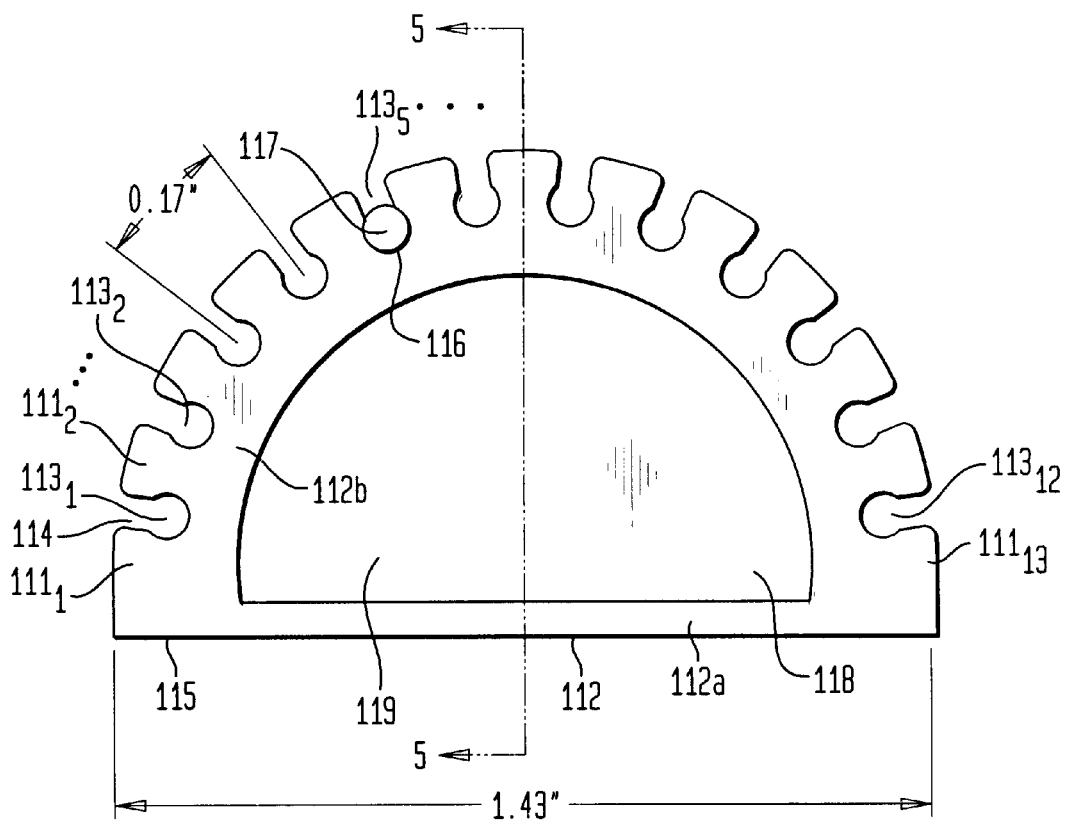
FIG. 4 is the front elevational view of the splice holder of the present invention.

FIGS. 3 and 4 illustrate a splice holder 100 of the present invention having many of the elements of the prior art splice holder 10 previously described with reference to FIGS. 1 and 2, wherein the same elements of the splice holder 100 are correlated to the same elements of the splice holder 10 by reference numbers that are displaced from each other by a value of 100.

Unlike splice holder 10 having a flat base 12, base 112 is semi-cylindrical and hollow, having a flat portion 112a and a circumferential curved portion 112b, enclosing a space therebetween. Similar to flat base 12, the bottom mounting surface 115 of flat portion 112a is mounted on a plastic housing for additional structural support (not shown). Parallel, spaced apart members 111 extend radially outward from the outer surface of the curved portion 112b. Between adjacent members, such as $111_1$ and $111_2$, is a channel $113_1$, for retaining a splice. Splices 117 along channels 113 are at a distance away from the bottom mounting surface 115 of flat portion 112a of the base 112 such that more access space are available between bottom surface 115 and the underside 116 of splices 117 to facilitate removal of splices.

Figure 5:
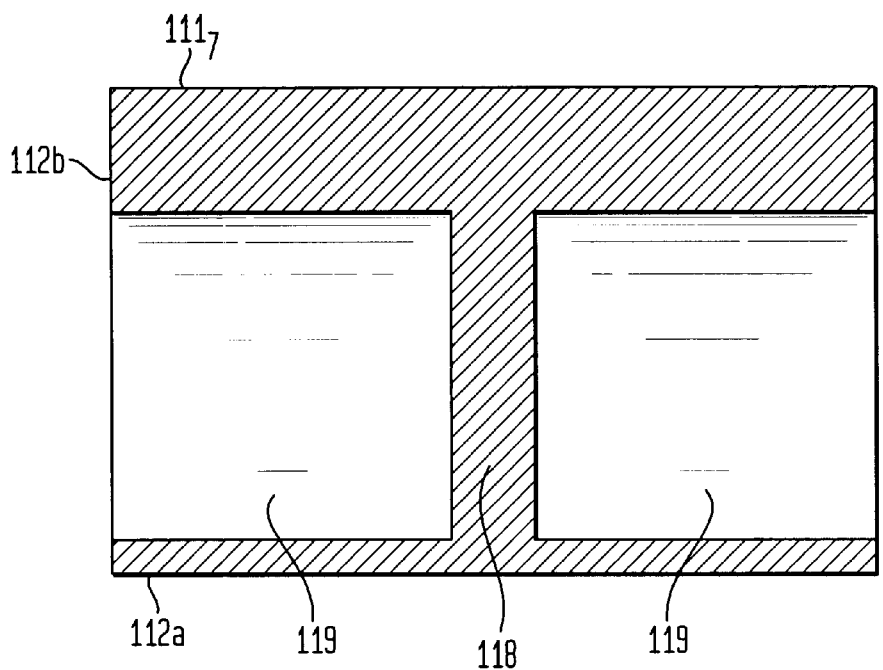
FIG. 5 is a cross-sectional view of the splice holder of the present invention taken along line 5—5 in FIG. 4.

Within the hollow base 112 is a transversely extending wall 118 dividing the hollow space into two cavities 119, best shown in FIG. 5. Wall 118 provides additional structural support to the curved portion 112b of base 112 to retain and secure splices along channels 113. Furthermore, the two cavities 119 further improve access to the undersides 116 of splices 117 by a technician by providing spaces for placement of fingers during removal of a splice 117 from splice holder 100. Thereby, facilitating removal of splices.

FIG. 4 illustrates a typical dimension of splice holder 100 having a width of 1.43 inches, with adjacent channels being 0.17 inch apart, identical to those dimensions of prior art splice holder 10 shown in FIG. 2. The additional surface area provided by the circumferential curved portion 112b accommodate a total of twelve channels 113, four more than prior art splice holder 10. In comparison with prior art splice holder 10, splice holder 100 increases the density of splices 117 while maintaining the mounting surface area 115. Alternatively, splice holder 100 may have only eight channels 113 as the prior art splice holder 10, but with adjacent channels 113 being further apart to minimize interference with adjacent splices 117 during removal.

Although base 112 of splice holder 100 as shown in FIGS. 3–5 is semi-cylindrical in shape, other hollow shaped base, such as triangular, oval, rectangular, etc., can be used and is contemplated herein.

Although certain features of the invention have been illustrated and described herein, other better modifications and changes will occur to those skilled in the art. It is, therefore, to be understood that the appended claims are intended to cover all such modification and changes that fall within the spirit of the invention.

What I claim is:

1. A device for securing and retaining a plurality of fiber optic splices, said splices have corresponding cross-sectional areas, comprising:

a base having a first flat portion and a second enclosing portion defining a longitudinal hollow space therebetween to facilitate access to said splices;

a plurality of parallel, spaced part resilient members integrally extending longitudinally from said second portion opposite said space; and each adjacent pair of said members defining a channel therebetween for retaining one of said splices, each of said channels have a cross-sectional area generally corresponding to said cross-sectional areas of said corresponding splices for frictional hold.

2. The device according to claim 1 further comprising a dividing wall within said hollow base for structural support of said second portion.

3. The device according to claim 2 wherein said dividing wall is transverse to the longitudinal axis of said members.

4. The device according to claim 3 wherein said splices have undersides, said dividing wall defines two cavities in said hollow space for access to the undersides of said splices.

5. The device according to claim 4 wherein said first flat portion is mounted on a fiber optic tray.

6. The device according to claim 1 wherein said splices further have corresponding cross-sectional widths, wherein each of said channels have a constricted neck dimensioned to be slightly narrower than said width of said corresponding splices for additional frictional hold.

7. The device according to claim 6 wherein said second portion of said base is semi-cylindrical in shape.

8. The device according to claim 6 wherein said second portion of said base is V-shaped.

9. The device according to claim 6 wherein said second portion of said base is U-shaped.

10. The device according to claim 1 wherein said base and said members are made of a foam material.

* * * * *